UNITED STATES PATENT OFFICE.

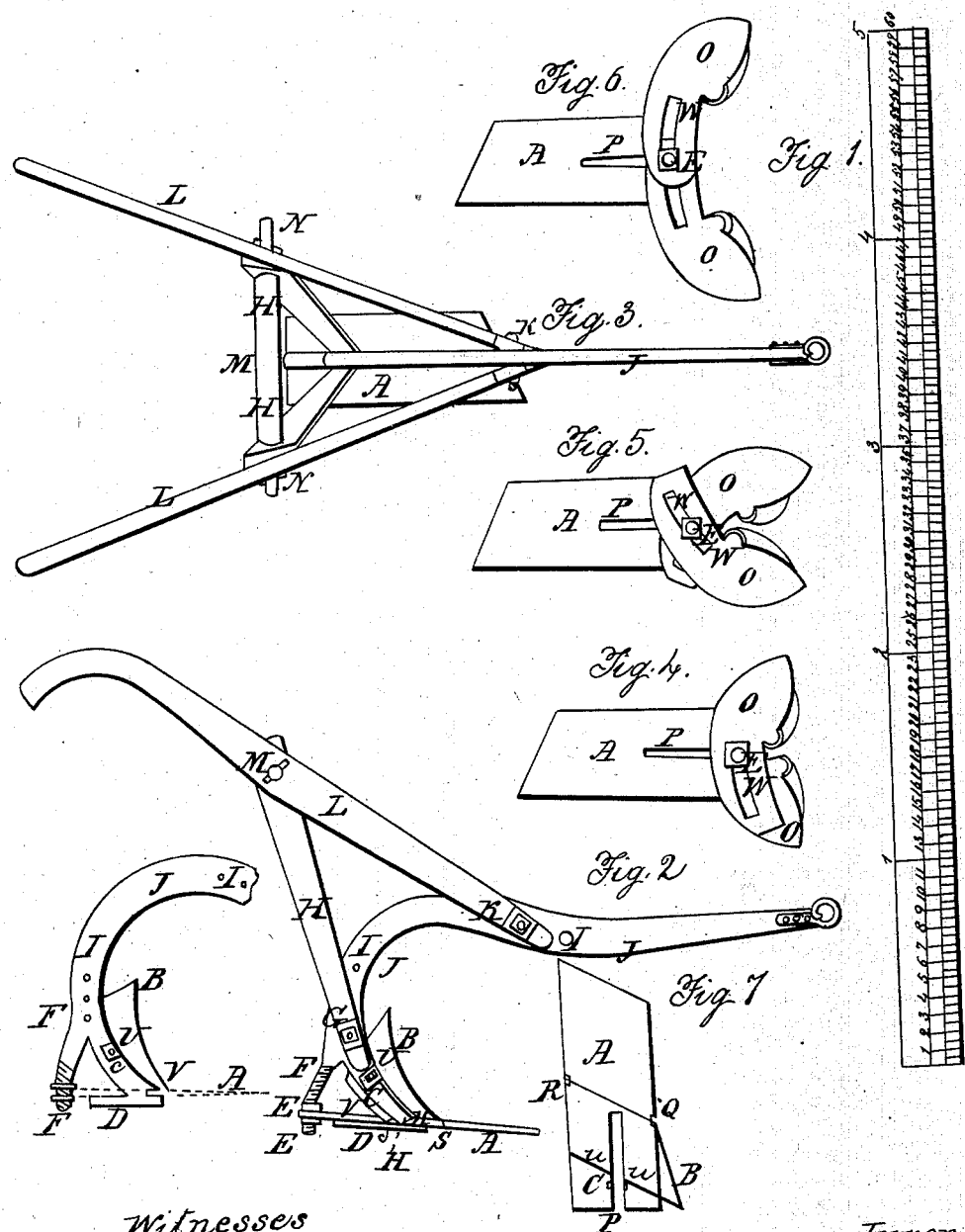

RHODOM M. BROOKS, OF GREENVILLE, GEORGIA.

IMPROVEMENT IN PLOWS.

Specification forming part of Letters Patent No. 26,563, dated December 27, 1859.

*To all whom it may concern:*

Be it known that I, RHODOM M. BROOKS, of Greenville, in the county of Meriwether, in the State of Georgia, have invented a new and Convenient Self-Sharpening Plow; and I hereby declare that the following is a full, clear, and exact description of the construction and operation of the same, reference being had to the annexed drawings, making part of this specification.

Like letters refer to like parts in the different figures.

Figure 2 is the side view or projection of the plow.

A represents the plow hoe or scraper, which is so arranged that it can be turned and sharpened by its operation in plowing.

B is the turning wing or share, secured to plow-beam J by clamps U and screw-bolt C.

D represents piece of iron attached to plow-foot, and extending back to protect the rod F from damage.

E E are the nuts and washers on the end of rod F, by which plow-hoe A is confined.

F is an iron rod with screw to elevate or depress the plow-hoe A.

G is a bolt with cuffs to confine the stays H H to the plow-foot J.

H H are the stays which support handles L L.

I I I are holes through beam J, to be used for changing the position of handles L L with beam J.

J represents the beam and iron feet F and D in one piece, curved to prevent clogging.

K is a bolt with cuffs to confine handles L L to beam J.

M is the cross-piece coupling the handles L L with the stays H H.

V is a notch in the end of plow-foot, in which plow-hoe A rests.

N N, Fig. 3, are the keys which hold the handles in their proper places.

O O O, Figs. 4, 5, and 6, are iron mold-boards with openings W, by means of which they are secured to plow-foot at F by nuts E E; also represent the arrangement of mold-boards in different positions, to be used for small, medium, and full sweeping.

P represents the opening in the plow-hoe A by which it is secured to the plow-foot by notch V in piece D.

Fig. 7 represents top view of mold-board B with plow-hoe A attached.

Q and R show the notches in plow-hoe A by which the mold-board B is confined by the hooks S S, Fig. 2.

S in Fig. 2 is a small pin connecting mold-board at 2, as shown in Fig. 7.

Fig. 3 is a direct top view of the plow, reference being had to the corresponding letters in other figures.

What I claim as my invention, and desire to secure by Letters Patent, is—

The arrangement of beam J, screw-foot F, notch V, plow-hoe A, opening P, mold-boards O, openings W, nuts E E, holes I I I, constructed as described, for the purposes set forth.

RHODOM M. BROOKS.

Witnesses:
JAMES HEARD,
JAMES D. HUDSON.